INVENTORS
HAGEN B. GILLENWATER
PHILLIP K. HAREIN
GERALD EASON

United States Patent Office 3,290,112
Patented Dec. 6, 1966

3,290,112
APPARATUS FOR DISPENSING INSECTICIDES
Hagen B. Gillenwater, Phillip K. Harein, and Gerald Eason, Savannah, Ga., assignors to the United States of America as represented by the Secretary of Agriculture
Filed Mar. 9, 1965, Ser. No. 438,433
3 Claims. (Cl. 21—110)

A non-exclusive, irrevocable, royalty-free license in the invention herein described, throughout the world for all purposes of the United States Government, with the power to grant sublicenses for such purposes, is hereby granted to the Government of the United States of America.

This invention relates to apparatus for dispensing fumigant vapors, such as insecticides or the like. More particularly, it relates to an apparatus for dispensing fumigant vapors inside warehouses and other large enclosures where insect infestation of stored products is a problem.

Although new highly effective and fast-acting insecticides have become available in recent years, many of these insecticides leave residues which are toxic to human beings and other mammalian life. This is particularly true of the low-volatile, solid and liquid poisons which must be used in relatively large amounts for maximum effectiveness. Furthermore, while these substances can conveniently be used as dusts or liquid preparations for application to surfaces, such as building structures or growing plants, their use for control of insect infestations in stored products in warehouses has been limited by the difficulty in effective distribution throughout the contents of the warehouse or other enclosure, especially where the contents are closely packed. Even where the insecticides are dispensed in the form of aerosols, the efficiency of distribution leaves much to be desired, and there is also the ever-present danger of toxic residues from aerosol fallout in stored products which are to be used as food. Accordingly, extensive research has been carried out to find new insecticides which would be sufficiently volatile to produce toxic vapors which could be rapidly distributed within an enclosure and which, because of their volatility, would not leave any toxic residue.

Several classes of compounds have been introduced recently which possess the desirable properties of volatility and high insect toxicity at low vapor concentrations. Among these are certain phosphorus-containing compounds, exemplified by 2,2-dichlorovinyl dimethyl phosphate (DDVP). Although existing equipment has been adequate to fumigate small enclosures, such as individual rooms or the interior of aircraft, it has not been adequate for use in warehouses where it is necessary to achieve a rapid and uniform distribution of the toxicant vapors in a large and frequently filled enclosure.

Accordingly, one object of the present invention is to provide an apparatus capable of rapidly—almost instantaneously—building up an effective concentration of toxicant vapors throughout a large storage zone. Another object is to provide an apparatus capable of maintaining an effective concentration uniformly throughout the zone. Other objects will become apparent to those skilled in the art from the description of the invention which follows.

In general, in accordance with the present invention, the foregoing objects are achieved by an apparatus which comprises means for rapidly passing a large volume of heated air through an aggregate of volatile insecticide pellets at a temperature sufficient to volatilize an effective amount of insecticide and at a pressure and rate sufficient to rapidly distribute and maintain a uniform concentration within a large storage zone. Means are provided for regulating the temperature and volume of air passed through the pellets and for controlling the duration of treatment.

In order that the invention may be better understood by those skilled in the art, reference is made to the following detailed description and to the accompanying drawings in which.

Figure 1:
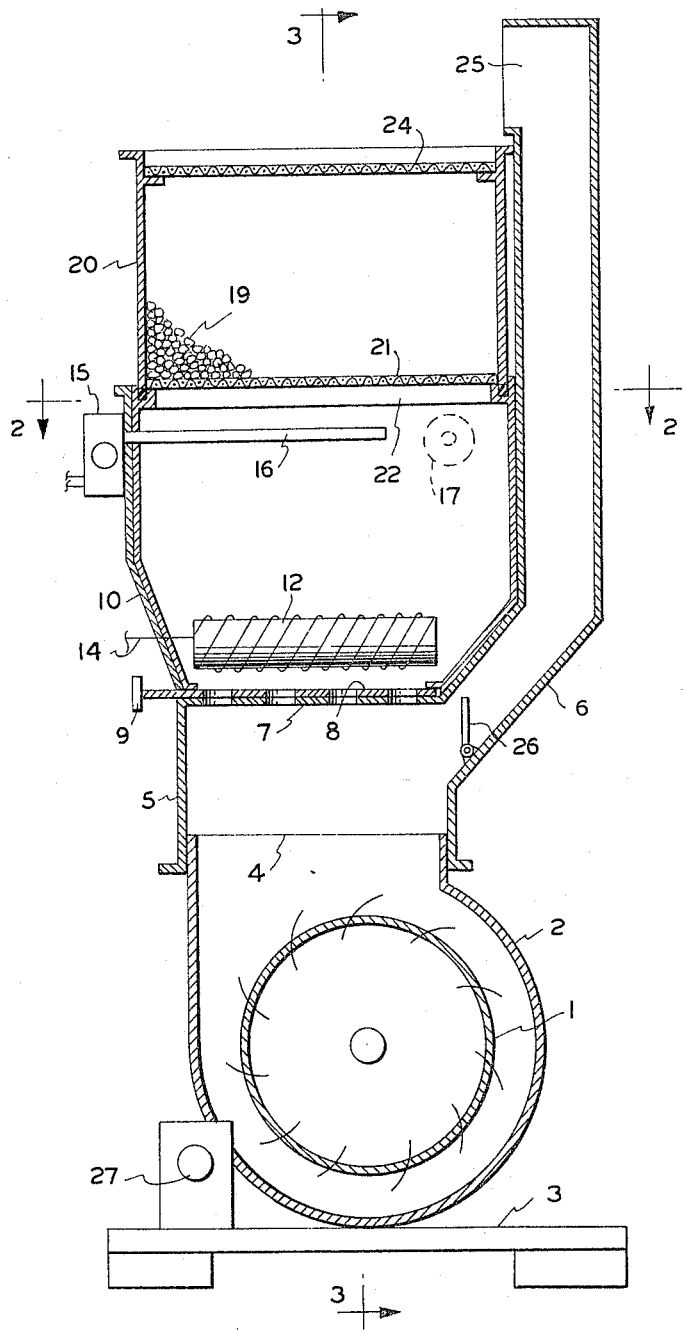
FIGURE 1 is a front elevation, in section, of a preferred form of the apparatus.
Figure 2:
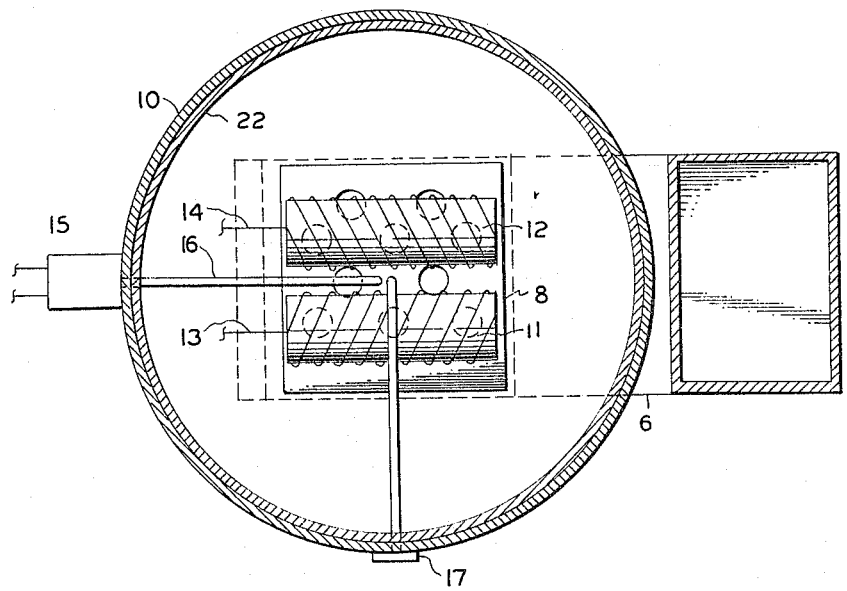
FIGURE 2 is an enlarged plan section taken on line 2—2 of FIGURE 1.
Figure 5:
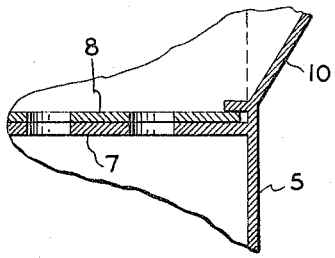
FIGURE 5 is an enlarged sectional view showing the structural details of the corner enclosed in the circle designated as "b" in FIGURE 3.
Figure 3:
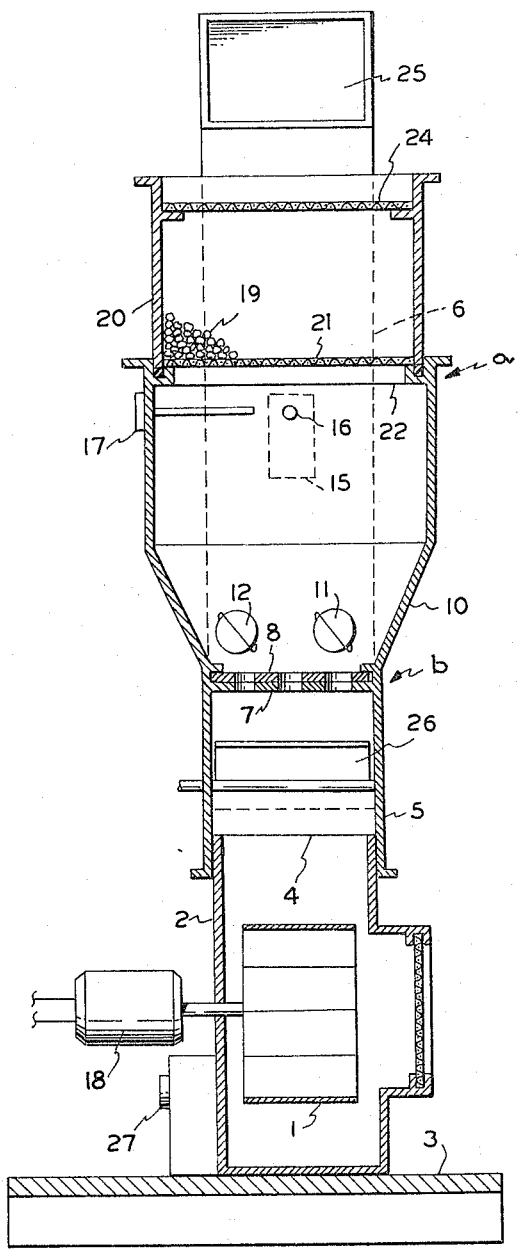
FIGURE 3 is a vertical transverse section taken on line 3—3 of FIGURE 1.

Referring particularly to FIGURES 1 and 3, it will be seen that the apparatus comprises a centrifugal blower 1, mounted for rotation within housing 2 and supported in any suitable manner on base 3. The outlet end 4 of the blower housing is fitted with an adapter 5 having a sidewardly and upwardly extending duct 6 and a stationary perforated top plate 7. A second, slidable perforated plate 8, having an outwardly extending handle 9, rests on top of plate 8, as seen in FIGURES 2 and 5. Together, the two plates form a means for regulating the air flow from blower 1 to the apparatus above.

Still referring to FIGURES 1 and 3, it will be seen that, attached to adapter 5, over the air-flow regulator plates 7 and 8, is an inverted conical air heating chamber 10. Mounted directly above the air-flow regulator plates, in any suitable manner (not shown), within chamber 10, is a pair of electrical heating coils 11 and 12, which are connected by means of leads 13 and 14, respectively, to any suitable source of power (also not shown). A thermostatic switch 15, whose sensing element 16 extends inside chamber 10, is mounted on the outside wall of the chamber 10. In addition, a dial thermometer 17 is also mounted on the outside wall of the air-heating chamber to indicate the inside temperature to the operator. Thermostat 15 is connected to the blower motor 18 and heating coils 11 and 12 in a manner which will be familiar to the skilled mechanic.

Figure 4:
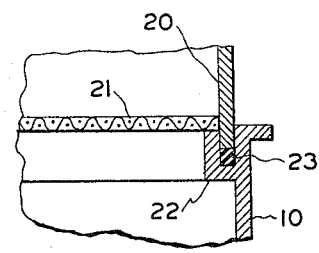
FIGURE 4 is an enlarged sectional view showing the structural details of the corner enclosed in the circle designated as "a" in FIGURE 3.

The volatile insecticide to be dispensed is in the form of pellets 19 which are contained in cartridge 20. The cartridge is a hollow cylindrical container closed at its bottom end with a wire mesh screen 21. Cartridge 20 is supported in air heating chamber 10 by means of shoulder 22 which forms part of or is secured to the inner wall of chamber 10. This shoulder is in the form of a channel provided with a gasket 23 on which the lower rim of cartridge 20 rests, as shown in the enlarged details of FIGURE 4. Cartridge 20 is provided with a removable cap 24 made of the same screen material as bottom 21. Duct 6 extends to a point just above the top of cartridge 20 and then turns so that its upper opening 25 directs a flow of air across the top of the cartridge. A valve 26 inside duct 6 regulates the amount of air directed to the duct. The apparatus is provided with an automatic timer 27 which is connected to the blower in a manner (not shown) which will be familiar to a skilled mechanic. This timer is a commercially available item which can be programmed to operate the dispenser for any desired period, as for example, for 1 to 24 hours on one or more days per week.

In operation, the formulation cartridge is filled with insecticide-impregnated resin pellets. Part of the air from the blower enters the air-heating chamber through the air-flow regulator and is heated as its passes over the electric heater elements. Air temperature is selected by adjusting the thermostatic switch that controls the heater elements to any desired temperature (±5° F.) shown on the dial thermometer. The heated air enters the formulation cartridge through the wire cloth bottom, flows over the resin pellets, and is exhausted through the cartridge cap. Additional air provided by the blower is channeled through the air duct of the adapter and directed across the top of the formulation cartridge.

As will be apparent to those skilled in the art, the dimensions of the apparatus will depend on its intended use. In tests conducted in warehouses having 126,000 cu. ft. and 166,656 cu. ft. capacity, a dispenser was used which was provided with an 8-inch centrifugal blower, rated to deliver 870 cubic feet of air per minute at 0.25 inch static pressure through a 6 x 8 inch outlet. The air duct 6 had a cross-section of 4 x 6 inches. Flow of air was regulated by the two plates 7 and 8 which consisted of 6-inch square metal plates, each having twelve ¾-inch diameter holes equally spaced within a 5-inch diameter circle from the center of the plate. Air heating chamber 10 was an inverted frustum of a right circular cone, 6 inches high, having a 5-inch diameter opening at the bottom and a 12-inch diameter opening at the top. The heaters 11 and 12 were rated at 1800 watts each. Cartridge 20 was a cylinder 12 inches in diameter and 12 inches high, and was closed at the bottom with 18-mesh wire cloth of a corrosion-resistant metal. Cap 24 was made of the same material.

The tests were conducted with resin pellets impregnated with the insecticide DDVP, at an air-heating chamber temperature of about 125° F.±5, in both an empty warehouse and one having about 30 percent of the air space occupied by stored item. It was found from analyses of air samples taken at each of four quadrants that DDVP vapor concentrations were substantially uniform throughout each respective quadrant of the enclosures and that distribution patterns were reproducible. Two hours after starting, vapor concentrations were near their maximum levels and remained substantially constant during the period of operation.

Having described our invention, what we now claim is as follows:

1. Apparatus for dispensing fumigant vapors comprising:
    (a) a blower for providing a stream of air;
    (b) means defining an air-heating chamber connected to and in communication with the blower;
    (c) air-flow regulating means disposed between the blower and the air-heating chamber;
    (d) air-heating means mounted within the air-heating chamber;
    (e) means connected to and in communication with the air-heating chamber for holding a volatile fumigant, the blower, air-heating chamber, and fumigant-holding means being so dispersed that air from said blower flows through said air-heating to said fumigant-holding means; and
    (f) a duct connected to the blower for separately conducting a stream of air over the fumigant-holding means.

2. Apparatus for dispensing fumigant vapors comprising:
    (a) a blower for providing a stream of air;
    (b) means defining an air-heating chamber having an inlet end and an outlet end connected by said inlet end to the blower and being in communication therewith;
    (c) air-flow regulating means disposed between the blower and the air-heating chamber;
    (d) air-heating means mounted within the air-heating chamber;
    (e) temperature controlling means connected to the air-heating means;
    (f) a fumigant container having an inlet end and an outlet end connected by said inlet end to the outlet end of the air-heating chamber and being in communication therewith;
    (g) a duct connected to the blower for separately conducting a stream of air across the outlet end of the fumigant container; and
    (h) timing means connected to the blower for controlling the duration of operation of said blower.

3. The apparatus of claim 2 wherein the air-heating means comprises electrical heating means.

References Cited by the Examiner

UNITED STATES PATENTS 2,732,632 1/1956 Koster _____ 34—233
2,884,228 4/1959 Jorgensen _____ 165—103 X MORRIS O. WOLK, *Primary Examiner.*

F. W. BROWN, *Assistant Examiner.*

UNITED STATES PATENT OFFICE
CERTIFICATE OF CORRECTION

Patent No. 3,290,112　　　　　　　　　　　　　　December 6, 1966

Hagen B. Gillenwater et al.

It is hereby certified that error appears in the above numbered patent requiring correction and that the said Letters Patent should read as corrected below.

Column 4, line 10, for "dispersed" read -- disposed --.

Signed and sealed this 19th day of September 1967.

(SEAL)
Attest:

ERNEST W. SWIDER
Attesting Officer

EDWARD J. BRENNER
Commissioner of Patents